US012159778B2

(12) United States Patent
Krummen et al.

(10) Patent No.: US 12,159,778 B2
(45) Date of Patent: Dec. 3, 2024

(54) INERT NON-ADSORBING CRIMPABLE CAPILLARIES AND DEVICES FOR ADJUSTING GAS FLOW IN ISOTOPE RATIO ANALYSIS

(71) Applicant: Thermo Fisher Scientific (Bremen) GmbH, Bremen (DE)

(72) Inventors: Michael Krummen, Bad Zwischenahn (DE); Jens Radke, Bremen (DE); Johannes Schwieters, Ganderkesee (DE); Nils Stöebener, Bremen (DE); Ronald Seedorf, Weyhe (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 18/473,991

(22) Filed: Sep. 25, 2023

(65) Prior Publication Data

US 2024/0021424 A1 Jan. 18, 2024

Related U.S. Application Data

(60) Division of application No. 17/321,386, filed on May 14, 2021, now abandoned, which is a continuation of
(Continued)

(30) Foreign Application Priority Data

Mar. 1, 2018 (GB) ..................................... 1803377

(51) Int. Cl.
*H01J 49/04* (2006.01)
*H01J 49/00* (2006.01)

(52) U.S. Cl.
CPC ...... *H01J 49/0404* (2013.01); *H01J 49/0031* (2013.01); *H01J 49/0422* (2013.01)

(58) Field of Classification Search
CPC ........ H01J 49/00; H01J 49/02; H01J 49/0404; H01J 49/0031; H01J 49/0422; G01N 27/62; G01N 30/7206; G01N 2030/6008
(Continued)

(56) References Cited

U.S. PATENT DOCUMENTS 3,018,793 A 1/1962 Fridtjof et al.
5,316,262 A * 5/1994 Koebler .................. F16K 7/061 251/8

(Continued)

FOREIGN PATENT DOCUMENTS

EP 0410289 A1 1/1991
GB 958801 A 5/1964

(Continued)

OTHER PUBLICATIONS

Brand, Mass Spectrometer Hardware for Analyzing Stable Isotope Ratios, Handbook of Stable Isotope Analytical Techniques, vol. 1, pp. 835-856. (Year: 2004).*

(Continued)

*Primary Examiner* — Jason L McCormack
(74) *Attorney, Agent, or Firm* — ALG Intellectual Property, LLC

(57) ABSTRACT

A gas transfer system for transferring gas into an analytical instrument for isotope ratio analysis comprises a capillary for delivering sample and/or reference gas from a gas source, a first connector for connecting the capillary to the gas source, a second connector for connecting the capillary to the analytical instrument, a crimping device, wherein the internal surface of the capillary comprises a coating material to prevent or minimize adsorption of water to the surface. Also provided is a device for regulating gas flow in a gas inlet system of an analytical instrument, comprising a body member having an internal gas flow channel, and a clamping
(Continued)

member for attachment to the body member such that when the clamping member is tightened onto the body member, the internal gas flow channel is adjustably and reversibly crimped, to adjust gas flow therethrough.

10 Claims, 9 Drawing Sheets

Related U.S. Application Data application No. 16/290,443, filed on Mar. 1, 2019, now Pat. No. 11,024,496.

(58) Field of Classification Search
USPC ......................................... 250/281, 282, 288
See application file for complete search history.

(56) References Cited

U.S. PATENT DOCUMENTS

| | | | | |
|---|---|---|---|---|
| 5,379,790 | A | 1/1995 | Bruce et al. | |
| 6,084,237 | A * | 7/2000 | Troster | G01N 1/4022 250/288 |
| 10,115,577 | B1 * | 10/2018 | Eiler | H01J 49/4215 |
| 2006/0022131 | A1 * | 2/2006 | Tojo | G01N 30/7266 250/288 |
| 2009/0159795 | A1 * | 6/2009 | Hatscher | H01J 49/0404 73/863.02 |
| 2009/0314057 | A1 | 12/2009 | Hatscher et al. | |
| 2010/0006451 | A1 | 1/2010 | Gordon et al. | |
| 2010/0072748 | A1 | 3/2010 | Van Pelt | |
| 2013/0146759 | A1 | 6/2013 | Ouyang et al. | |
| 2013/0192984 | A1 * | 8/2013 | Nomura | C25B 9/00 204/278 |
| 2014/0083174 | A1 * | 3/2014 | Reboud | G01N 1/28 250/281 |
| 2017/0184552 | A1 | 6/2017 | Guzzonato et al. | |

FOREIGN PATENT DOCUMENTS

| | | | |
|---|---|---|---|
| GB | 1029623 | A | 5/1966 |
| GB | 2549566 | A | 10/2017 |
| WO | WO-2012162036 | A1 | 11/2012 |

OTHER PUBLICATIONS

Brand W.A., et al., "Chapter 38—Mass Spectrometer Hardware for Analyzing Stable Isotope Ratios", Handbook of Stable Isotope Techniques, published 2004, Elsevier, vol. 1, pp. 835-858.

Extended European Search Report for Application No. 19160098.0, mailed Jul. 8, 2019, 10 pages.

G P De: "Part 2—Calibration and Correction Procedures, Standards, Mass Spectrometers, Experimental Isotope Fractionation Determination and General Information", Handbook of Stable Isotope Analytical Techniques, Jan. 1, 2004 (Jan. 1, 2004), pp. 833-1042, XP55599099, Amsterdam, Retrieved from the Internet: URL: https://ebookcentral.proquest.com/lib/epo-ebooks/detail.action?docID=318208 , [retrieved on Jun. 24, 2019].

* cited by examiner

INERT NON-ADSORBING CRIMPABLE CAPILLARIES AND DEVICES FOR ADJUSTING GAS FLOW IN ISOTOPE RATIO ANALYSIS

CROSS-REFERENCE TO RELATED APPLICATION

This application is a divisional application from U.S. application Ser. No. 17/321,386, filed May 14, 2021, which is a continuation of U.S. application Ser. No. 16/290,443, filed on Mar. 1, 2019, which claims the priority benefit under 35 U.S.C. § 119 to United Kingdom Patent Application No. GB 1803377.9, filed on Mar. 1, 2018, the entire disclosure of each of the aforementioned applications being incorporated herein by reference.

FIELD OF THE INVENTION

The invention relates to gas transfer systems for use in isotope ratio analysis, in particular, but not exclusively, isotope ratio analysis of molecules having more than one rare isotope. The invention furthermore relates to a device for regulating flow in gas transfer systems that use capillaries that cannot be regulated by conventional means.

BACKGROUND

Isotope ratio analysis is a methodology for determining the relative abundance of isotopes, for example in gaseous samples containing $CO_2$. For example, isotope ratio analysis can be used to determine the isotope ratios of carbon and oxygen, e.g. $^{13}C/^{12}C$ and/or $^{18}O/^{16}O$. Isotope ratio analysis is most commonly performed by optical spectrometry and mass spectrometry.

Precise and accurate isotope ratio measurements very often provide the only way to gain deeper insight into scientific questions which cannot be answered by any other analytical technique.

A particular challenge is presented by measurements of clumped isotopes, i.e. the determination of the fraction of molecules of a species which contain more than one rare isotope, e.g. $^{13}C^{18}O^{16}O$. For such species present in low abundance the equilibration with an interfering molecule will change the isotope abundance of the analyte isotopes.

Gas inlet systems for isotope ratio analysis are known in the art, especially for mass spectrometers. A general review of isotope ratio mass spectrometry and gas inlet systems is provided by Brenna et al., Mass Spectrometry Reviews, 1997, 16:227-258.

Determination of the isotope ratio of samples usually requires a comparative measurement of the isotope ratio of a sample gas and one or more reference gases with a known isotope ratio. A known type of gas inlet system for isotope ratio analysis therefore comprises a dual inlet system, including a sample gas inlet and a reference gas inlet into the analyser.

Isotope ratio analysers applied in such measurements include mass or optical spectrometers. Usually sample and reference gases are provided to these spectrometers from sample reservoirs via thin capillaries. Sample reservoirs include adjustable high vacuum bellows, small micro volumes of a fixed size.

In order to achieve accurate results, a sample gas and a reference gas of known isotope ratio are usually measured one after the other. Beneficially, sample gas and reference gas are often measured alternately if the sample amount permits. The isotope ratio of the sample gas is determined by comparing the isotope abundance of the two different gases. All currently used isotope ratio analysers exhibit a pronounced non-linearity, i.e., the measured isotope ratio changes with absolute signal intensity. To avoid non-linearity bias, sample and reference have to be measured at the same intensities. One common approach is to match sample and reference intensities by adjusting the gas flows though the respective capillaries. This is of special concern with the long integration intervals used in low abundance measurements, where the intensities of sample and reference show a significant decrease during the course of a measurement.

In principle, matching of sample and reference intensities may be achieved by:

a) opening or closing (at least partially) the inner bore of the capillary at one point b) precisely adjusting the length of a narrow diameter capillary c) re-adjusting the pressure at the reservoir side of the capillary during measurement, if possible.

Option a) is commonly preferred, as it allows for online adjustment of the gas flow, i.e. while measuring the signal intensity. Also, closing down the inner diameter results in a molecular gas flow downstream the crimp, while the gas in the section upstream remains under viscous conditions. This prevents any back diffusion of gas molecules against the gas flow direction, which would otherwise cause fractionation of the analyte gas, i.e. a separation in time of heavy and light isotopologues (W. A. Brand: *Mass Spectrometer Hardware for Analyzing Stable Isotopes*. In: Handbook of Stable Isotope Techniques, Vol. I, Elsevier, 2004).

Technically, closing or narrowing the bore of the capillary is realized by placing a crimp at or near the end of the capillary nearest the spectrometer. This crimp compresses the capillary, thereby reducing its inner diameter.

The deviation of the measured clumped isotope abundance from the arithmetically expected value is of special interest in science (e.g. the deviation of the measured abundance of $^{13}C^{18}O^{16}O$ from the one calculated from the abundance of $^{13}C$ and $^{18}O$ in $CO_2$). As this deviation reflects a non-equilibrium distribution, it can be reset by exchange processes on a surface (scrambling). A common observation is the exchange of oxygen atoms from water with those of $CO_2$ on the surface of the commonly used stainless steel capillaries, since capillaries made from this material attract water molecules onto their surface.

To circumvent scrambling, stainless steel capillaries have to be heated and kept under vacuum for a very long time (up to several months) before starting sample measurements. Alternatively, deactivated fused silica capillaries have been applied in clumped isotope measurements. These capillaries do not attract water onto their surfaces. However, it is not possible to reduce the inner diameter of fused silica capillaries by crimping.

In Dual-Inlet mass spectrometry (MS), there are typically two reservoirs or bellows, for introducing sample gas and reference gas respectively into the mass spectrometer. Prior to introduction of sample and/or reference gas, the bellows are evacuated using a vacuum pump.

A gas (such as $CO_2$) is subsequently administered into the bellows, e.g. from a tank or other suitable source of gas. During measurement, gas is allowed to flow from a bellows through a capillary and into the ion source of the MS.

Typically, one bellows contains a sample gas and the second bellows a reference gas. For accurate results, both gases must be measured one after the other or alternating.

Alternatively, sample $CO_2$ gas can be produced from a solid sample in a preparation system, such as the Kiel IV Carbonate Device from Thermo Fisher Scientific™. Here, a carbonate sample such as $CaCO_3$ is treated with phosphoric acid, which results in the release of $CO_2$. Two cryotraps can be used to remove water and other interferences, before the released $CO_2$ gas is transferred into the ion source via a capillary.

SUMMARY OF THE INVENTION

The present invention addresses ways to facilitate precise measurement of isotope ratios such as in particular in the analysis of clumped isotopes, by providing a system and device with which gas flow can be controlled and isotope scrambling prevented or reduced. The invention provides for this purpose a gas transfer system that comprises at least one crimpable capillary for delivering sample and/or reference gas to a mass spectrometer, and a crimping device for adjusting gas flow to the instrument by crimping the crimpable capillary. The internal surface of the capillary is inert with respect to any potential isotope scrambling, in particular inert to adsorption of at least water (i.e. the surface does not adsorb, or substantially adsorb, water) and preferably is sufficiently free of other contaminants, such as e.g. metal ions, which could cause a change in the isotopic composition of the sample gas passing through the capillary, i.e. which potentially could cause isotope scrambling. Desirably, the internal surface of the capillary is substantially free from contaminants, which potentially could cause isotope scrambling, e.g. metal ions. In this way, the isotope ratios measured exhibit reduced effects of isotope scrambling (compared to isotope ratios measured using the capillary without the inert internal surface or coating) and preferably are substantially free from effects of isotope scrambling. Thus, by the present invention, the need for extended heating of crimpable capillaries is eliminated, while precise online adjustment of gas flow through a narrow capillary bore is provided.

Another aspect of the invention provides a device for regulating gas flow in a gas inlet system of a mass spectrometer, which device comprises a body member having an internal gas flow channel with an inlet adapted to receive a capillary via a gas-tight connection and an outlet, for receiving and releasing gas respectively, the body member further being adapted to receive a clamping member in a location flanking the internal gas flow channel, and a clamping member for reversible attachment to the body member.

The obtained signal intensity from measuring the gas in the mass spectrometer is dependent on the gas flow and, therefore, on the pressure inside the gas source and the diameter of the capillary leading from the gas source into the mass spectrometer. The gas flow, and thereby signal intensity can be adjusted by controllably compressing or decompressing the bellows. However, it is not possible to regulate the gas flow in a very precise manner via bellows compression alone.

The above features along with additional details of the invention, are described further in the examples below, which are intended to further illustrate the invention but are not intended to limit its scope in any way.

The invention sets forth gas transfer system, for transferring gas into a mass spectrometer for isotope ratio analysis, in particular for isotope analysis that comprises scrambling-free measurement of clumped isotopes. The system comprises at least one crimpable capillary, for delivering sample and/or reference gas from at least one gas source into a mass spectrometer, at least one first connector for connecting the at least one capillary to the at least one gas source, at least one second connector, for connecting the at least one capillary to the mass spectrometer, at least one crimping device, adapted to receive the at least one capillary and adjust gas flow into the mass spectrometer by crimping the at least one capillary, wherein the internal surface of the crimpable capillary comprises a coating material to prevent or minimize adsorption of water to the surface. The coating material preferably should further be sufficiently free of other contaminants that could cause a change in the isotopic composition of a sample gas passing through the capillary, such as but not limited to metal ions.

Both the first and second connector can be, respectively and independently, any of a range of conventional connectors known to the skilled person. In some embodiments, the first and/or second connector comprises a compression-type fitting, such as a Swagelok™ fitting for example.

As mentioned herein above, the term reference gas refers in the present context to a gas comprising species with known isotopic composition. The species can be but is not limited to carbon dioxide gas, carbon monoxide gas, nitrogen gas, nitrogen oxides (e.g. $N_2O$ or NOx), hydrogen gas or oxygen gas. The species in certain embodiments can constitute a minor component (<50% by volume), a substantial component (e.g. the largest component) and preferably a main (e.g. >50% by volume) component and even more preferably substantially the sole component of the reference gas.

The gas source can be a gas tank, a gas bellows, syringe, or other suitable gas storage devices. The gas source can have an adjustable volume for the contained gas, such as a bellows or syringe. Sample gas and reference gas can be provided by the same kind of gas source (e.g. bellows), or they can be provided through different kinds of gas sources. For example, sample gas can be provided by a sample preparation device. Such devices generate a sample gas in situ, i.e. via internal sample gas generation. An exemplary sample preparation device is the Kiel IV Carbonate Device from Thermo Fisher Scientific™.

The crimping device is suitably and preferably adapted to adjust the inner diameter of the capillary through crimping of the capillary, thereby adjusting gas flow through the capillary and into the mass spectrometer. Through such arrangement, the cross-sectional area at the point of crimping can be reduced e.g. by at least about 10% or at least about 20% or at least about 30% or at least about 40% or at least about 50% or at least about 60% or at least about 70% such at least about 75% or at least about 80% or at least about 90% or at least about 95%, or more, such as at least about 97% or at least about 98% or at least about 99%.

The term "crimping" shall, in the present context, be taken to mean the compression or folding of an item, such as a tube, capillary or channel. A "crimping device" is therefore a device that has the functionality of compressing and/or bending a tube or capillary or channel. As a result of the compression or bending, the internal bore of the tube and/or channel is narrowed, resulting in restricted fluid flow through the tube or channel.

The term "crimpable" shall, in the present context, be taken to mean that the structure that the term relates to is flexible, deformable and/or bendable. For example, a crimpable wall shall, in the present context, be understood to mean a wall that gives way when force is applied to it, i.e. the wall is bendable, deformable and/or flexible, in response to an external force that is applied to the wall.

The crimpable capillary is in some embodiments a stainless steel, metal or alloy capillary, coated on its internal surface with the above-mentioned coating material in order to prevent or minimize adsorption of water to the surface. The coating is in some embodiments but is not limited to a silica-based or silicon-based coating, and is in some embodiments deposited on the internal surface by chemical vapor deposition (CVD).

Depending on the preferred system and/or sample, the system of the present invention comprises in some embodiments two capillaries, for delivering respectively sample gas and reference gas into the analytical device. In such embodiments either one but preferably both capillaries is arranged with a crimping device as described herein and either one or both capillaries can suitably be comprised from a material mentioned above, with internal coating as described above. In some embodiments, at least a capillary that is for delivering reference gas from at least one source of reference gas is received in the crimping device for crimping by the device.

The gas transfer system of the invention can be suitably used with an isotope ratio mass spectrometer. The capillary or capillaries of the system are suitably arranged to transfer gas into an ion source of the mass spectrometer. Thus, the second connector(s) in such embodiments may connect the capillary (or capillaries) to the ion source.

In one embodiment of the gas transfer system of the invention, the crimping device comprises a first body member and a second body member configured to mate with each other in a detachable manner. The first body member may have a groove for seating a capillary and the second body member holds a crimping member that is disposed so that when the members are attached to each other, the crimping member is adjustably forced onto the capillary, so as to crimp the capillary in an adjustable manner, thereby reducing the cross-sectional area at the point of crimping, reducing gas flow therethrough as compared to a non-crimped state.

The first and second body members can suitably be configured to mate with each other using one or more fasteners. The fasteners could be one or more screws or bolts, for example. That is, the first and second body members can be assembled by being bolted together or screwed together. Thus, the first body and second body may each have one or more aligned holes to receive a respective fastening bolt or screw. In the case of using one or more screws, the one or more holes in at least one, preferably both, of the first and second body members may be threaded or are tightened using nuts. In one embodiment, one or more mating screws are used by having one or more threaded holes in the first body member and corresponding one or more threaded holes in the second body member for alignment with the one or more threaded holes in the first body member, for receiving one or more threaded screws. Thus, tightening the one or more fastener forces together the first and second body members, thereby crimping a capillary lying on the first body member. In an alternative embodiment of fastening together the first and second body members, the first body member can have one or more holes and the second body member can have one or more corresponding holes for alignment with the one or more holes of the first body member, whereby one or more bolts can be arranged through the aligned one or more holes and tightened using bolts to force together the first and second body members, thereby crimping a capillary lying on the first body member.

The invention further provides a device for regulating gas flow in a gas inlet system of a mass spectrometer, which device can be advantageously used with a glass capillary or other non-crimpable capillary. The device comprises a body member having an internal gas flow channel with an inlet and an outlet, for receiving and releasing gas respectively. The body member is adapted to receive a clamping member in a location flanking the internal gas flow channel on a crimpable portion of a wall of the internal gas flow channel, the mentioned wall forms part of the body member and is defined between the gas flow channel and the mentioned location where the clamping member is received. The clamping member of the device is configured for reversible attachment to the body member in the mentioned location, the clamping member comprising at least one crimping portion that is disposed so that, when the clamping member is attached to the body member, the crimping portion meets the mentioned crimpable portion of the wall of the internal gas flow channel. The crimping portion is adapted so that when the clamping member is attached to the body member and force is applied thereto, perpendicular to the internal gas flow channel, the crimpable portion of the wall of the internal gas flow channel is forced inwardly at the point of contact between the crimping portion and the wall, thereby reducing the cross-sectional area of the channel at the mentioned location, and thus gas flow through the internal gas flow channel is reduced, as compared to the non-crimped gas flow channel.

In this device, the crimpable portion of the wall and the cooperation between the crimpable portion and clamping member is preferably such that the crimping is reversible. This entails that the wall can be elastically bent inwards, and the clamping member being configured so as not to cause non-reversibly bending or other deformation of the wall. In some embodiments, the crimpable portion of the wall has a thickness in the range from about 0.5 mm or from about 0.75 mm, to about 2 mm or to about 1.5 mm or to about 1.25 mm, such as about 0.5 mm, about 0.8 mm, or about 1 mm. In one embodiment, the clamping member comprises at least two holes for receiving mating clamping screws or bolts and the body member comprises aligned holes to receive the same screws or bolts, so that when tightened the screws or bolts force the clamping member onto the body member, thereby generating force onto said crimpable portion of said wall resulting in reduced gas flow through the internal flow channel. In the case of using screws, the holes of at least the body member or the clamping member, preferably both, are threaded to receive the screws, or nuts are used to tighten the screws.

The crimping device is suitably and preferably adapted to adjust the inner diameter of the gas flow channel through crimping of the wall, which is preferably reversible, thereby adjusting gas flow through the gas flow channel and into the mass spectrometer. Through such arrangement, the cross-sectional area at the point of crimping can be reduced e.g. by at least about 10% or at least about 20% or at least about 30% or at least about 40% or at least about 50% or at least about 60% or at least about 70% such at least about 75% or at least about 80% or at least about 90% or at least about 95% or at least about 98%.

The device may in some embodiments comprise at least one groove for receiving the crimping portion of the clamping member but is not limited to any particular outer shape. Such groove may suitably be adapted to render at least a portion of the body comprising the groove deformable by the crimping member, which portion comprises the point of contact of the crimpable portion of the above defined wall between the gas flow channel and said location.

The crimping portion may in certain embodiments comprise at least a partially cylindrical structure, such as a semi-cylindrical structure, that is disposed so that when attached to the body member, the at least partially cylindrical structure is approximately perpendicular to the internal flow channel. The cylindrical structure may comprise a cylinder or partially cylindrical surface having a radius of curvature such as but not limited to in the range from about 0.5 mm or from about 1 mm or from about 2 mm, or from about 3 mm or from about 4 mm, to about 8 mm, or to about 6 mm, or to about 5 mm, e.g. from 0.5 to 8 mm or from 2-6 mm or from 3-6 mm, such as about 2 mm or about 3 mm or about 4 mm or about 5 mm. The cylindrical structure may be mounted on a plate, thus the cylindrical structure and plate make up the clamping member, that is adapted to be clamped to the body by means of the at least two clamping screws.

It is an advantage of the invention that the internal flow channel can be configured with a narrow diameter, such as but not limited to an inner diameter in the range from about 100 μm, or from about 150 μm or from about 200 μm or from about 250 or from about 300 μm, to about 800 μm or to about 600 μm or to about 500 μm or to about 400 μm, e.g. from 100-800 μm or from 200-600 μm or from 200-500 μm, or from 200-400 μm, such as about 250 μm or about 300 μm or about 350 μm or about 400 μm. The aforementioned ranges refer to the diameter of the flow channel before crimping. In some embodiments, the internal flow channel comprises a section with a narrower diameter than the remaining portion of the channel, in such embodiments the narrower portion preferably has a diameter within the above-mentioned ranges and values. It follows that the narrower section is preferably located adjacent the crimpable portion of the wall of the internal gas flow channel and that the crimping portion of the clamping member is adapted to crimp the internal gas flow channel within the narrower section. The wider portion may have an inner diameter in the range from about 300 μm or from about 400 μm or from about 500 μm, to about 2 mm or to about 1.5 mm or to about 1 mm or to about 800 μm, e.g. from 300 μm to 2 mm or from 500 μm to 2 mm or from 300 μm to 1.5 mm or from 500 μm to 1.5 mm or from 300 μm to 1 mm or from 500 μm to 1 mm.

In one embodiment of the device, the body member comprises an elongate body such as but not limited to an elongate cylindrical body, having an internal gas flow channel, the elongate body further comprising the above-mentioned groove and a receiving plate extending radially from the elongate body, flanking the groove. The receiving plate in this configuration comprises threaded receiving holes for receiving the clamping screws, so that when the clamping member is mounted on the body member, the crimping portion sits in the groove and exerts force onto the gas flow channel through tightening of the clamping screws.

It follows from the above description of the device that the inlet is preferably adapted to receive a capillary via gas-tight connection, such as but not limited to a connection comprising a silver ferrule which may be further connected via a nut or the like. In some embodiments of the device, the narrower section of the internal gas flow channel has an internal diameter that is narrower than the external diameter of the capillary, whereby the capillary does not extend into the narrower section of the gas flow channel and thus is not crimped when the gas flow channel is forced inwardly. Such configuration can be readily connected with a suitable connection such as described.

The device described herein is useful for use with a capillary that is not otherwise crimpable, such as but not limited to a glass capillary, including a capillary comprising ceramic, silica, and/or other glass. The capillary should preferably comprise at least on its internal surface, or could be made entirely from, a material that does not substantially adsorb water to the surface. The device itself may be made from but is not limited to metal or a metal alloy, and is preferably made from stainless steel.

The invention further provides the use of the device described above for isotope ratio analysis of a gas from a sample. The gas to be analysed can be from a gaseous sample or derived from a solid and/or liquid sample, for example as is further described below in the detailed description. It follows that the use of the device according to the invention is suitable for isotope ratio analysis conducted with an isotope ratio mass spectrometer, such as but not limited to the use for isotope ratio analysis of a gas selected from carbon dioxide, carbon monoxide, hydrogen, nitrogen, nitrogen oxides (e.g. $N_2O$ or NOx) and sulfur dioxide.

The invention further provides a method for isotope ratio analysis of a gas sample, comprising: transmitting a sample gas through a capillary into an isotope mass spectrometer and performing a first isotopic measurement, providing at least one reference gas and transmitting the at least one reference gas through a capillary into the isotope mass spectrometer and performing a second isotopic measurement, wherein gas flow into the isotope mass spectrometer is adjusted by crimping at least one of the capillaries, through the first and/or second isotopic measurement to obtain substantially equal gas flow during isotopic measurement. Preferably, at least the reference gas flow, and optionally both sample and reference gas flow, is adjusted by said crimping. The capillary in the method is preferably a stainless steel, metal or alloy capillary coated on its internal surface with a coating material to prevent or minimize adsorption of water to the surface. Alternatively, the capillary is in other embodiments a non-crimpable capillary, preferably a glass, silica or ceramic capillary that does not adsorb water. In such embodiments of the method, with a non-crimpable capillary, a device as described herein above is suitably used to adjust the gas flow, preferably at least the reference gas flow. The method can be suitably used for isotopic analysis of a gas selected from gas is selected from carbon dioxide, carbon monoxide, hydrogen, nitrogen, nitrogen oxides (e.g. $N_2O$ or NOx), and sulfur dioxide. The method is useful for the analysis of clumped isotopes, i.e. the determination of the fraction of molecules of a species which contain more than one rare isotope. The method is useful for delivering and analysing small volume samples with low absolute quantity of analyte relative to the internal surface of the sample transfer capillary, where it is thus important to transfer the sample into the analyser without any exchange/scrambling of isotopes between the sample and interfering and/or reactive species. In some embodiments, the method comprises transmitting the sample from sample container selected from a microvolume tube, an adjustable gas bellows system, and a gas bottle. The microvolume can for example be, but is not limited to, a microvolume $CaCO_3$ decomposition tube.

The invention additionally provides a method for isotope ratio analysis of a gas sample, comprising: transmitting the sample gas from a least one gas source with adjustable volume through a first capillary into a mass spectrometer and performing a first isotopic measurement; providing at least one reference gas from another reservoir; transmitting the at least one reference gas through a second capillary into the mass spectrometer and performing a second isotopic measurement; wherein gas flow into the isotope analytical instrument is adjusted by means of a crimping device as described herein, for the first and/or second isotopic measurement to obtain substantially equal gas flow during measurements of reference gas and sample gas.

BRIEF DESCRIPTION OF THE DRAWINGS

The skilled person will understand that the drawings, described below, are for illustration purposes only. The drawings are not intended to limit the scope of the present teachings in any way.

DETAILED DESCRIPTION OF THE INVENTION

In the following, exemplary embodiments of the invention will be described, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

It should be appreciated that the invention is applicable for elemental and isotope analysis of liquid or gaseous samples in general by mass spectrometry techniques. In general, therefore, the sample that is being analysed in the system will be variable.

The present invention provides a gas inlet system for delivery of gas into a mass spectrometer for isotope ratio measurements. In particular, the invention provides a solution to the practical problem of gas flow regulation into isotope ratio mass spectrometers, and at the same time avoid or reduce introduction of artefacts that can influence the determination of isotope ratio, for example due to isotope scrambling.

Thus, the invention finds particular use during measurement of clumped isotopes, for example rare isotopologues within a single molecular species, such as $^{13}C^{18}O^{16}O$.

In dual inlet isotope ratio mass spectrometry (dual inlet IRMS), the gas flow into the mass spectrometer is alternated between a sample gas and a reference (or standard) gas, so that a comparison of measurements for the two gases can be made. The reference gas can be analysed either before or following the sample gas, or both before and following the sample gas (so-called bracketed measurements).

Figure 1:
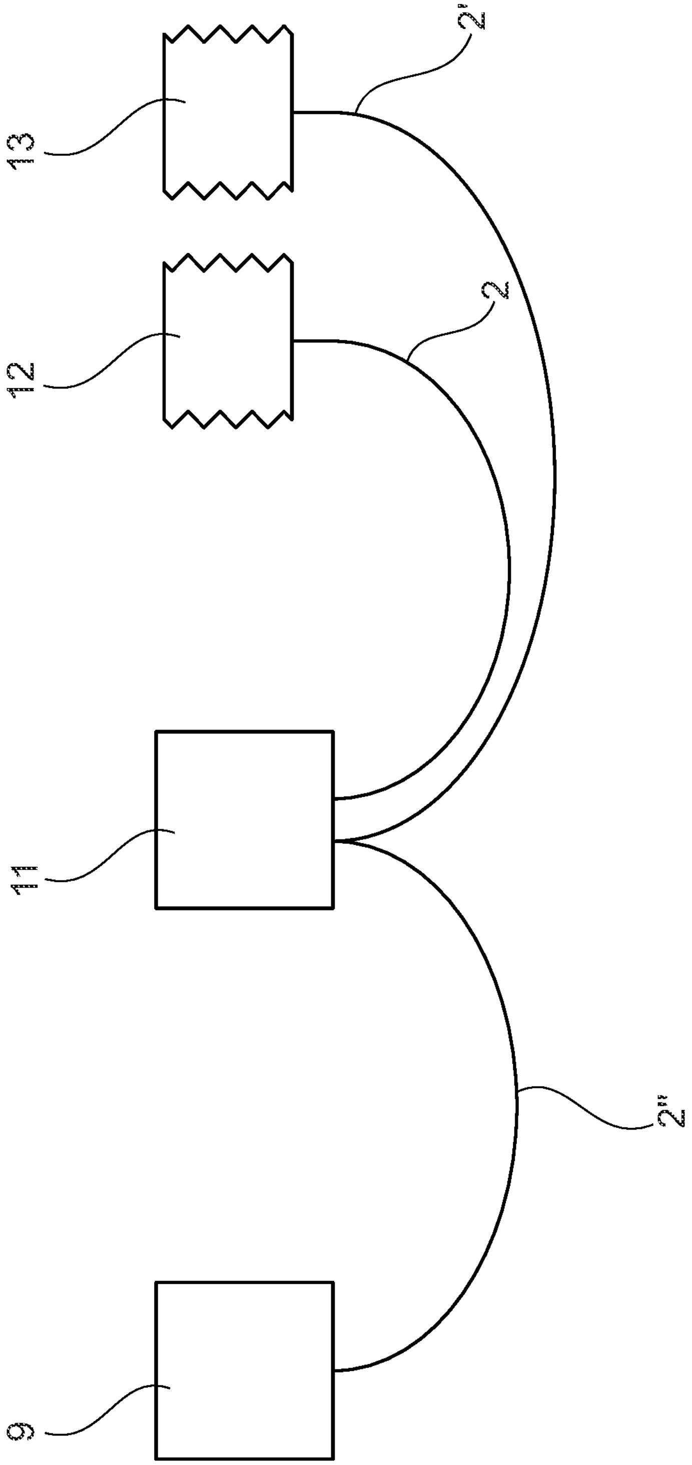
FIG. 1 shows a schematic diagram illustrating a dual inlet IRMS.

In FIG. 1 there is shown a schematic diagram illustrating a dual inlet IRMS. Sample gas and reference gas can be provided by gas reservoirs or bellows 12,13. Gas flows through capillaries 2,2' from the sample bellows and into the ion source 11 of the mass spectrometer.

Alternatively, or additionally, sample gas can be provided by means of a sample preparation system 9. In such a system, sample gas is generated or prepared in situ for subsequent analysis in the mass spectrometer. The sample gas is transferred from the sample preparation system 9 to into the ion source 11 via capillary 2". An exemplary sample preparation system is provided by the Kiel IV Carbonate Device from Thermo Fisher Scientific™. In this device, calcium carbonate is digested using phosphoric acid, resulting in the release of carbon dioxide ($CO_2$) gas. Water and other interfering species are removed using cryotraps before transferring the carbon dioxide gas into the mass spectrometer via capillary 2". As such preparation devices are commonly used together with small sample amounts, the resulting sample gas volume may be so small an adjustment of the gas flow by adjusting a bellows is not an option. Therefore, the gas flow through the respective capillary has to be adjusted by crimping.

Figure 2:
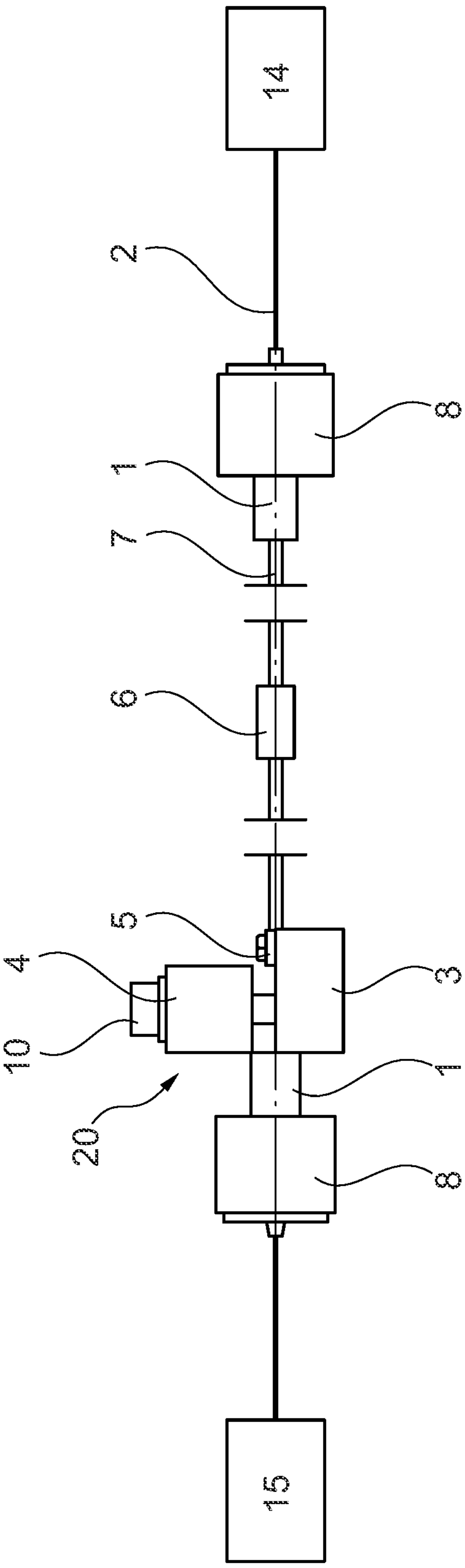
FIG. 2 shows a gas inlet system suitable for an isotope ratio instrument.

Referring to FIG. 2, there is shown a gas inlet system for use with a mass spectrometer for isotope ratio measurement and which may, in some embodiments, form a part of a dual inlet system, for example of the type shown in FIG. 1. The gas inlet system is at one end connected to a gas source 14, which can for example be provided by gas tanks or gas bellows as sources of sample or reference gas, or other source of sample gas, such as a Kiel IV sample preparation system. At the other end, the gas inlet system is connected to the inlet 15 of a mass spectrometer for isotope ratio measurements, for example the inlet of a mass spectrometer ion source. Sample and/or reference gas flows through an internally coated crimpable capillary 2, which has an internal surface that is coated with a chemically inert or deactivated coating to prevent or reduce isotope scrambling due to water or other species present on the capillary wall that could introduce such scrambling.

Preferred inert or deactivated surface coatings include: silicon or silicon based coatings (specific examples include SilcoNert®1000 or Silcosteel coated capillaries and SilcoNert® 2000 or SulfiNert® or SilTek® coated capillaries); coatings that are deposited by chemical vapor deposition (CVD), including such coatings as the SilcoNert® or SulfiNert® coatings mentioned and coatings applied by thermal decomposition and fuctionalization of silanes (described in U.S. Pat. No. 6,444,326, incorporated herein). Preferably, the inert or deactivated surface coating does not allow water to adsorb on its surface, or other species that induce scrambling. Capillaries that are made of metal, e.g., steel or nickel, and have an inert or deactivated inner coating are preferred. Such capillaries are crimpable but inert on their inner surface.

Gas flow into the mass spectrometer can be adjusted using a crimping device 20, which is positioned on the capillary near the spectrometer end of the capillary. The crimping device 20 has a first body member in the form of lower part 3 and a second body member in the form of upper part 4, and which can be used to crimp the capillary 2 to adjust gas flow through the capillary. Crimping of the capillary is adjusted by means of screws 10 that adjust the force applied by the crimping device 20 onto the capillary. The capillary 2 sits between the upper and lower parts, and is held in place by metal plate 5, which has screws for holding the capillary in place on the crimping device 20.

A metal piece 6 can be soldered around the capillary and serves as an electrical contact. The capillary may be heated after installation by an electrical current through the metal piece, capillary, and the (grounded) mass spectrometer. This ensures complete removal of water traces residing in the capillary despite the coating. The capillary is furthermore enclosed by a silicone tubing 7, which serves to provide protection to the capillary 2.

A metal cylinder 1, is soldered to the capillary 2 and used to connect the capillary at one end to the mass spectrometer source and at the other end to the sample source (e.g., dual inlet and/or Kiel IV device, not shown), using connector 8, for example Swagelok™ fitting.

Application of force to the capillary 2 at a localised portion thereof by the crimping device 20 adjusts the gas flow through the capillary by partial closing of the capillary. The torque applied by the crimping device determines the degree to which the capillary is closed at the crimped portion, thereby restricting gas flow through the capillary.

Figure 3B:
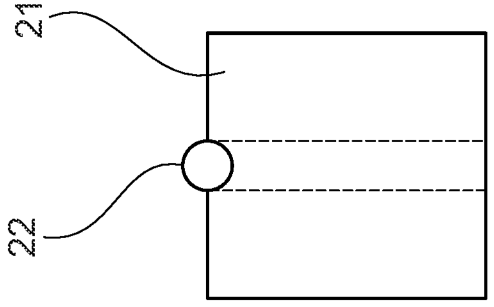
FIG. 3B shows the end-on side view.
Figure 3A:
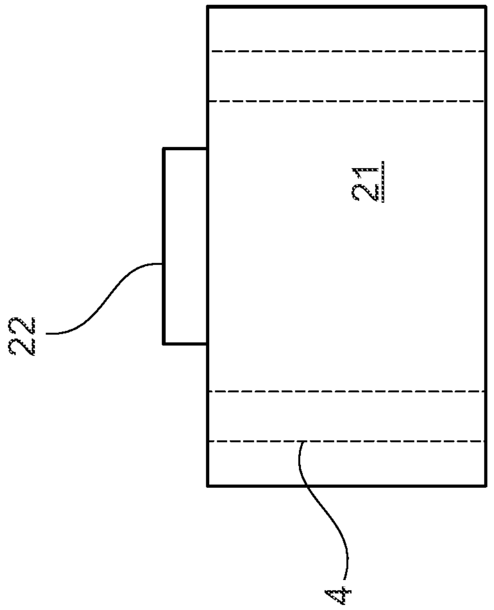
FIG. 3A shows the side view of an upper part of a crimping device for crimping a capillary, as further described herein.

In FIG. 3, a side view of the upper part 4 (second body member) of the crimping device 20 is shown in (a). The upper part 4 comprises a metal (e.g. steel) block 21, on which a crimping member in the form of a cylinder 22 is attached, and which provides the force that compresses the capillary. The cylinder 22 in some embodiments may be formed integrally as part of the block 21 in the form of a cylindrical surface part thereof. The cylinder 22 is long enough to provide uniform force across the capillary when force is applied to the capillary. The cylinder 22 can typically be provided with a length that is about ⅓ to about ½ of the width of the metal block.

The upper part 4 furthermore has two holes (indicated by dashed lines in FIG. 3) for introducing therethrough the clamping screws 10 (not shown in FIG. 2), flanking the cylinder 22.

In FIG. 3 (*b*), an end-on side view is shown, showing how the cylinder 22 is provided in a shallow depression or groove in the metal block 21, providing structural support to the cylinder as force is applied to compress the capillary.

Figure 4:
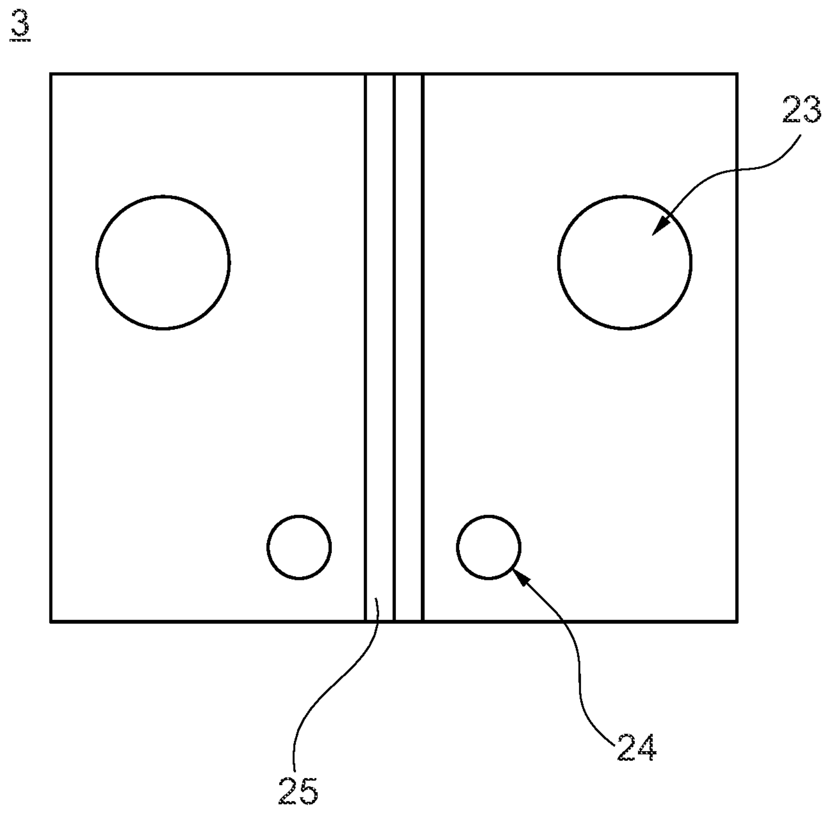
FIG. 4 shows the top view of a lower part of a crimping device for crimping a capillary, as further described herein.

A top view of the lower part 3 of the crimping device is shown in FIG. 4. The lower part 3 has two larger threaded holes 23, for receiving clamping screws 10. Also shown are smaller threaded holes 24, that receive screws (not shown) securing the plate 5 that holds the capillary 2 in place. Along the lower part 3, there is also a groove 25, for holding the capillary 2 in place.

The upper part 4 clamps onto the lower part 3, so that the cylinder 22 extends perpendicular to the groove 25, within which capillary 2 sits. As force is applied to the cylinder 22 by means of the clamping screws 10, the capillary is crimped by the cylinder 22, thereby restricting gas flow through the capillary. Thereby, gas flow adjustment is possible, using the chemically inert capillary 2.

Figure 5A:
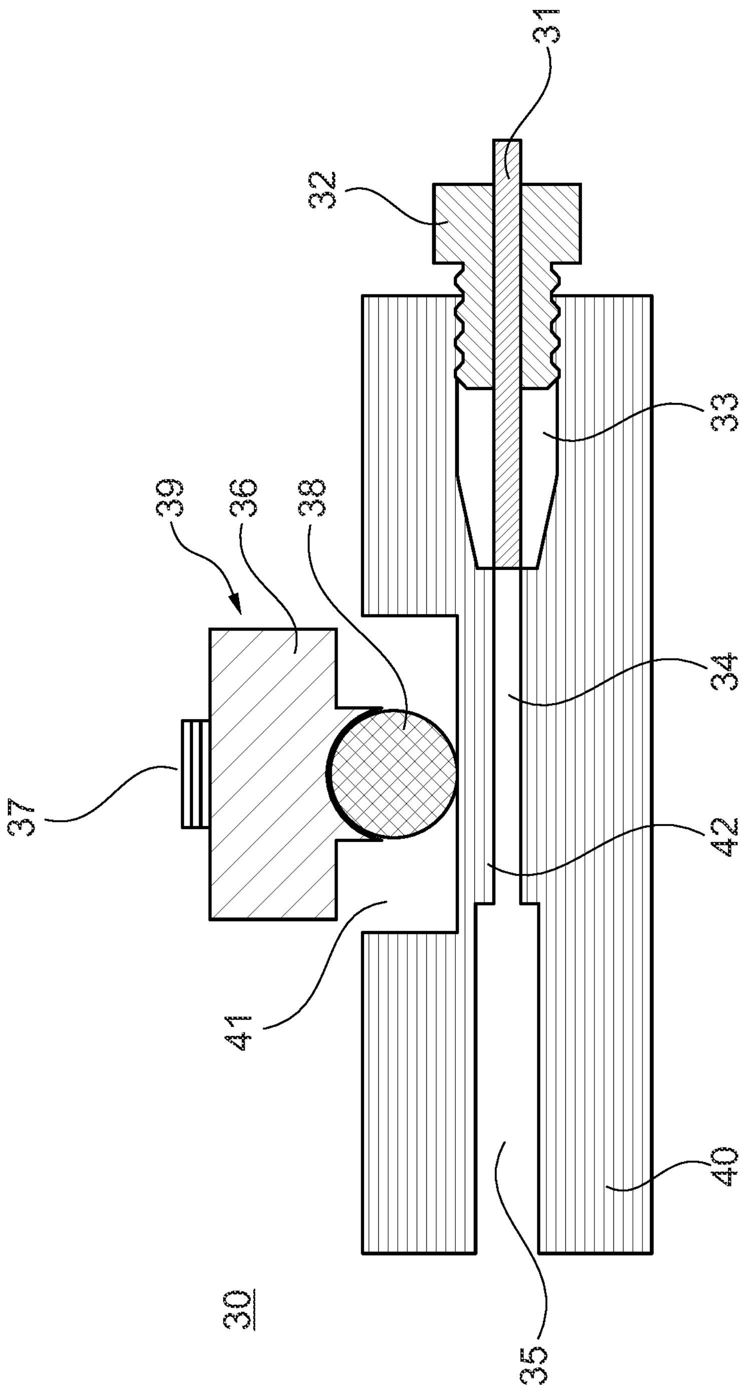
FIG. 5A shows a cross-sectional view along the longitudinal axis of a device for regulating gas flow comprising a body member with an internal gas flow channel, and a crimping member.
Figure 5B:
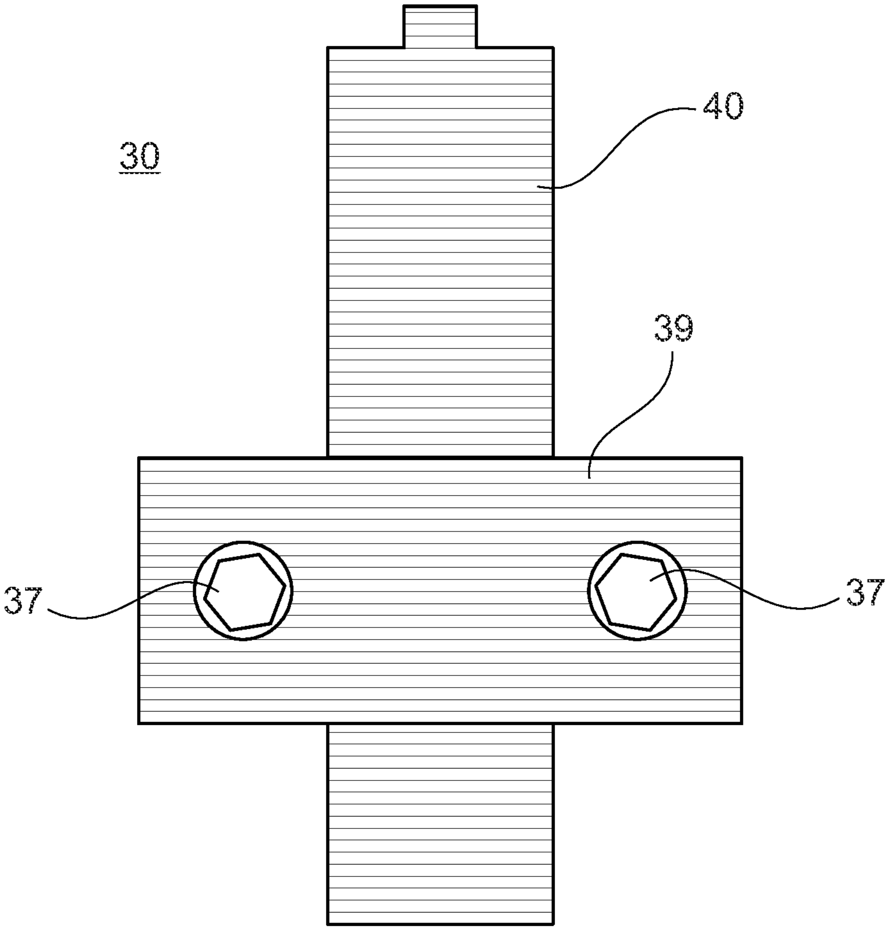
FIG. 5B shows the top view of the device.

Turning to FIG. 5, there is shown in (a) a cross-sectional view of a device 30 for regulating gas flow. The device consists of a main body member 40 having a gas flow channel there through and a clamping member in the form of clamping body 39. A lower clamping piece (not shown in this view), containing threaded holes for receiving clamping screws, is attached to the main body 40, so that the clamping member can be attached and tightened on the main body. A capillary 31 is attached to the body 40 of crimping device 30 by means of a silver ferrule 33, which fits over the capillary and is received inside an open end of the gas flow channel, and a screw 32, which is screwed into an internally threaded end portion of the open end of the gas flow channel, so as to tighten the connection of the capillary 31 into the body 40. The use of the ferrules enables vacuum tight connection of virtually any capillary material to the spectrometer and the gas source. Within the device, there is a gas flow channel, having a narrow section 34 and a wider diameter main section 35. Gas flows through the attached capillary 31, into the gas flow channel of the device, exiting through its main section 35 after having passed through the narrow section 34.

The internal diameter of the gas flow channel in the wider section is preferably <2 mm and more preferably <1 mm (e.g. 500 μm to 1 mm). The gas flow channel can be manufactured e.g. by erosion of the metal of the body using a small, forward moving electrode. The narrow section 34 preferably has a diameter in the range of 200-500 μm such as about 300 μm, about 350 μm or about 400 μm.

A groove 41 is provided in the top of the main body 40. As a result of the groove 41, a wall 42 defining an upper portion of the narrow section 34 is formed. The thickness of the wall is relatively small, such as in the range of about 0.5 to 2 mm or the range 0.5 to 1.5 mm, or the range 0.75 mm to 1.25 mm, such as about 0.5 or about 1 mm and as a result the wall 42 is deformable by the application of external force to the wall by the clamping body 39. As a result, the narrow channel 34 is crimpable by the application of external force to the wall 42.

Force to the wall 42 is provided by the upper clamping body 39, which has a body provided as a steel block 36 which has two holes extending through, for insertion of clamping screws 37. In this cross-sectional view, only the screw head of screw 37 is shown. The clamping screws 37 screw into a threaded hole on the lower clamping body (not seen in this view). Extending from the lower surface of body 36 there is a cylinder 38, which rests on top of wall 42. Through application of force, provided by the tightening of clamping screws 37 perpendicular and downwardly onto channel 34, the channel 34 is narrowed and as a result, gas flow through the channel can be reduced.

Turning to FIG. 5 (*b*), there is shown a top view of the device 30. In this view, it can be seen how clamping screws 37 are arranged on the upper clamping body 39, the screws extending through the upper clamping body and screwing into a threaded hole in the lower clamping body (not seen in this view), flanking the main body 40.

Figure 6:
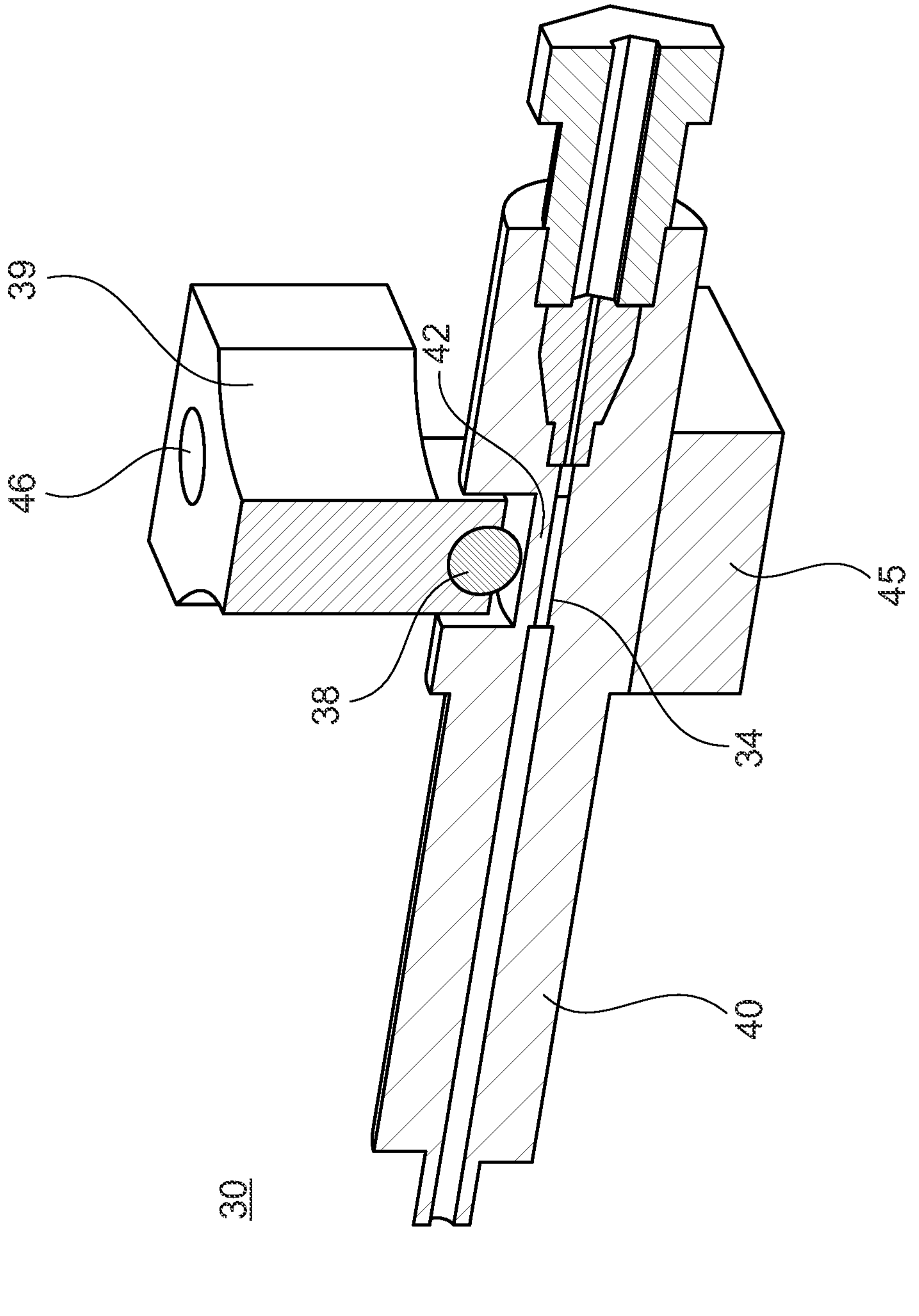
FIG. 6 shows a cross-sectional three-dimensional view of the device in FIG. 5.

A cross-sectional view of the FIG. 5 device is shown in FIG. 6. The crimping device 30 has upper 39 and lower 45 clamping bodies, the latter being attached onto the main body 40. The upper and lower bodies 39,45 are arranged such that when force is applied by tightening clamping screws 37 (not shown in FIG. 5) that extend through holes 46 on the upper clamping body 39 and screw into the lower clamping body 45, the channel 34 is narrowed by the torque applied to the wall 42 by a crimping portion in the form of a cylinder 38. Cylinder 38 is held in a groove or recess in the upper clamping body 39.

Figure 7:
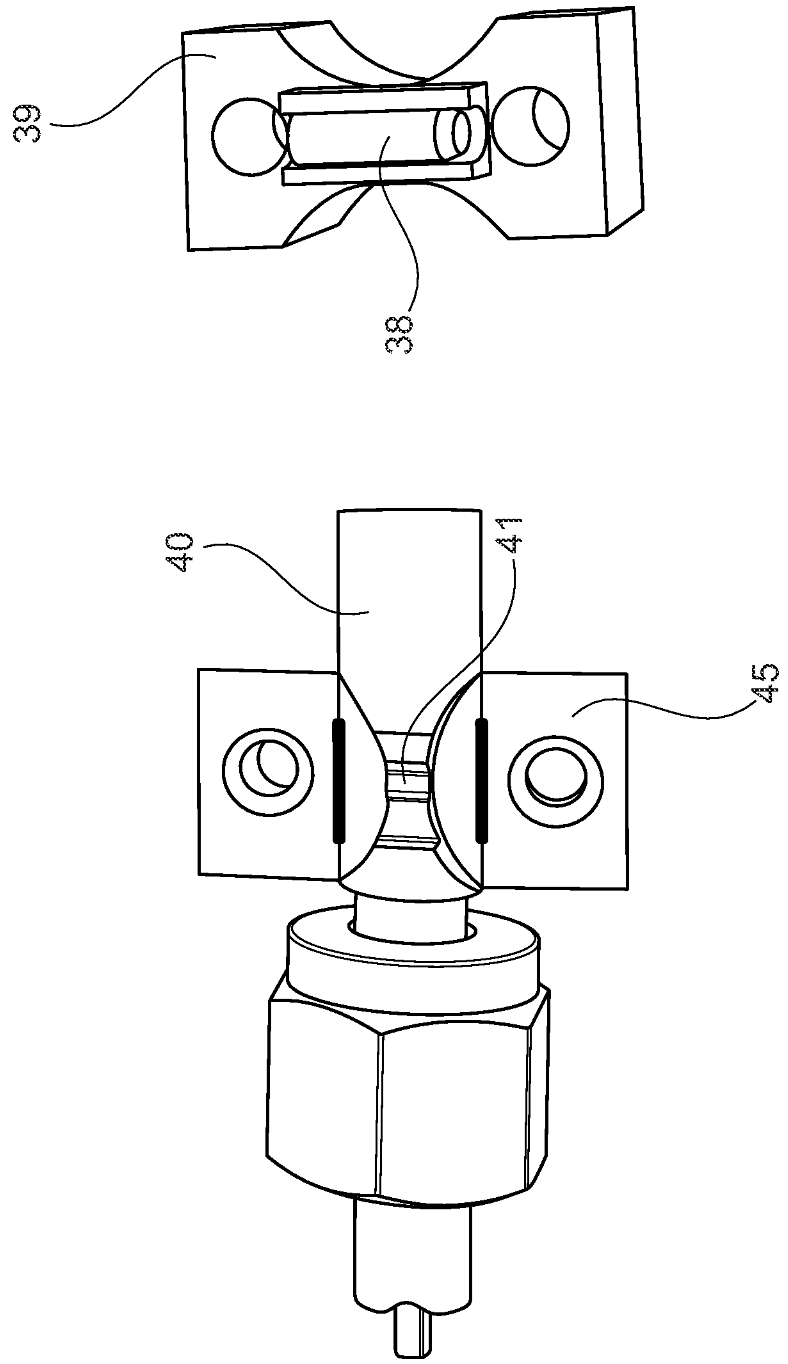
FIG. 7 shows drawings of the device, top view of the body member (left), and bottom view of crimping member.

The device 30 is further illustrated in FIG. 7. The lower clamping body 45 is attached to the main body 40. If manufactured separately, the lower clamping body can be soldered to the main body, so as to generate a single main body 40 onto which the upper clamping body 39 can be fastened.

Alternatively, the lower clamping body can be designed and manufactured to be separate from the main body and retain its function when in use, for example if the main body 40 rests on the lower clamping body 45, so as to provide structural support when the upper clamping body 39 is connected to the lower clamping body and force is applied to the main body sitting between the two clamping bodies 39,45.

The groove 41 in the main body 40 can be seen as a depression or trough into the otherwise generally cylindrical main body. The upper clamping body 39 is attached to the main body, with clamping screws 37 used to secure and fasten the upper clamping body 39 to the lower clamping body 45. Tightening the clamping screws results in the application of force perpendicular to the direction of the narrow channel within the main body, which in turn results in the cylinder 38 being forced onto the wall 42, which due to its relatively small thickness has elasticity that allows it to be forced into the channel 34, thereby crimping the channel 34 to restrict gas flow through the channel. Thus, the wall around the flow channel is so thin that it can be compressed to narrow the channel.

Figure 8:
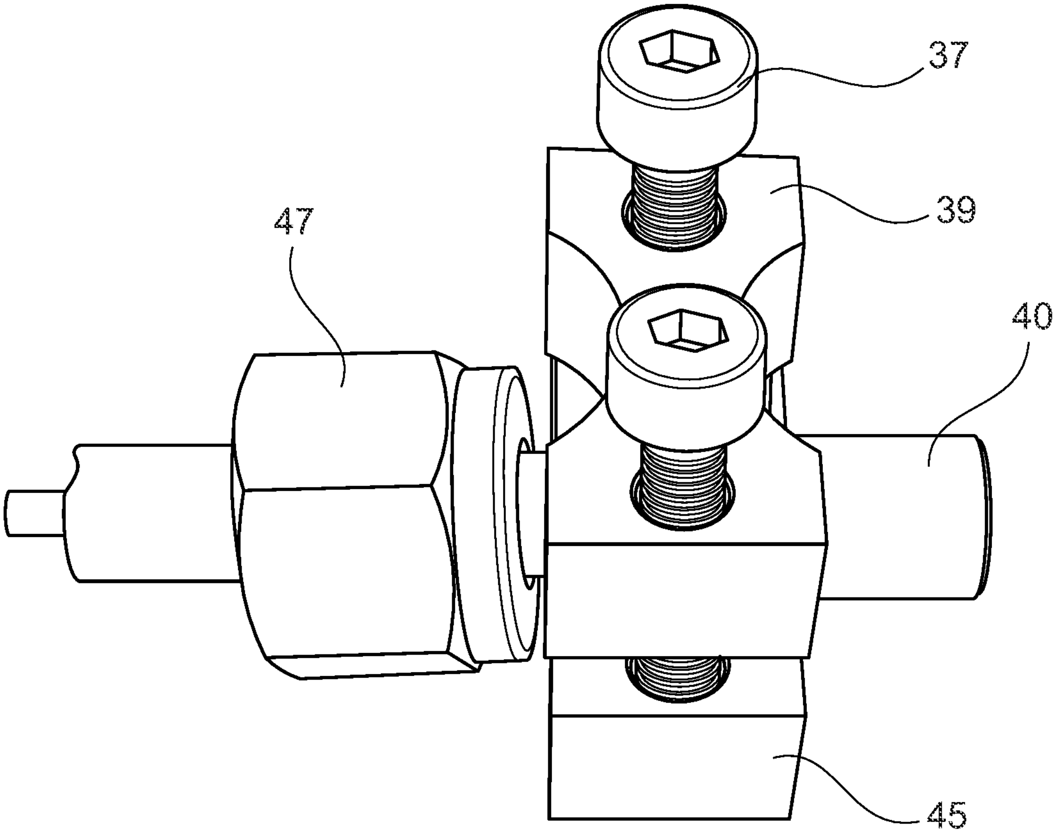
FIG. 8 shows a view of the assembled device.

An assembled device is shown in FIG. 8, with the upper clamping body 39 sitting on the main body, secured by the clamping screws 37. Further, a nut (Swagelok nut) 47, used to secure a gastight connection to an analytical device (e.g., mass spectrometer) is shown on the assembly.

Before use of the capillaries for measurement, torque can be adjusted by tightening the clamping screws 37. By doing so, the crimpings of all capillaries present on an instrument are adjusted in such a way the resulting instrument signal (e.g. detector voltage) is approximately the same for a given gas pressure in the gas reservoir. Alternatively, the crimpings may be adjusted so that for the same or at a different gas pressure, the decay in the instrument signal over time is the same with all capillaries. The latter is essential if the gas bleeds from a finite reservoir into the ion source (e.g. from a microvolume). After adjustment, the crimpings usually will not be changed again and the capillaries can be used for measurement. Following the measurement of sample gas, which may require as long as 10 minutes, or more, of continued measurements, a reference gas can be measured.

One capillary and crimping device as illustrated in the Figures could be used for the sample and reference gas measurements. Alternatively, as in a dual inlet isotope ratio mass spectrometer, separate capillaries and associated crimping devices can be provided for each of the sample gas and reference gas respectively. Further alternatively, e.g. in another dual inlet isotope ratio mass spectrometer, separate capillaries can be provided for each of the sample gas and reference gas respectively but only one capillary, typically the reference gas capillary, is provided with a crimping device, thereby to allow the flow of reference gas through the capillary to match the measured sample gas flow.

In the embodiments shown in FIGS. 5 to 8, a crimp is not placed onto the capillary itself, but onto a small gas flow channel inside the body of a crimping device. Thus, such embodiments of crimping device can be regarded as a capillary crimping adapter, which enable the use of non-crimpable capillaries such as glass, silica, ceramic capillaries. Certain such non-crimpable capillaries, which preferably have chemically inert internal surfaces, can be advantageous to use, e.g. so as to avoid or reduce isotope scrambling effects. The invention enables such capillaries to be used whilst still enabling control of the gas flow through the capillary by a crimping mechanism.

The setup allows virtually all kinds of capillaries to be used, e.g. stainless steel capillaries with an internal inert coating, such as a SilcoNert® or a Sulfinert® coating, or deactivated fused silica capillaries. Variants accepting capillaries of different diameters can be produced.

In addition, the internal walls of the gas flow channel, constituting a relatively small section of the gas flow path inside the crimping device, may be deactivated by an inert coating.

In summary, the present invention provides numerous advantages, including:

a. improved accuracy of isotope ratio measurements, especially of clumped isotopes, e.g., due to allowing scrambling-free measurement of clumped isotope abundance;

b. use of deactivated capillaries for measurement of isotope ratios that can be affected by traces of water (e.g., $^{18}O/^{16}O$ in $CO_2$);

c. use of a capillary crimping adapter to allow regulation of gas flows with capillaries that cannot be crimped due to material constrains (e.g., fused silica or capillaries with a larger or smaller outer diameter).

d. sealing capillaries using ferrules (e.g. silver ferrules), which enables the application of capillaries which cannot be soldered to provide gas tight connections (e.g., deactivated fused silica).

As used herein, including in the clauses and claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

What is claimed is:

1. A method of reducing isotope scrambling during isotope ratio analysis of a gas from a sample that comprises clumped isotopes, comprising:

transmitting the sample gas from at least one gas source through a first capillary into a mass spectrometer and performing a first isotopic measurement, at least a portion of the first capillary comprising a coating material to prevent or minimize adsorption of water to a surface of the first capillary, the coating material free of metal ions that could cause isotope scrambling of clumped isotopes;

providing at least one reference gas from another reservoir; and transmitting the at least one reference gas through a second capillary into the mass spectrometer and performing a second isotopic measurement, wherein gas flow into the mass spectrometer is adjusted by crimping the first capillary or the second capillary for the first or second isotopic measurements to obtain substantially equal gas flow during measurements of reference gas and sample gas.

2. The method of claim 1, wherein the first capillary or second capillary includes a crimpable stainless steel, metal or alloy capillary.

3. The method of claim 1, wherein the first capillary or second capillary includes a non-crimpable glass, silica, or ceramic capillary.

4. The method of claim 1, wherein said at least one gas source is a gas source with an adjustable volume.

5. The method of claim 1, wherein said reference gas is selected from carbon monoxide, carbon dioxide, hydrogen, nitrogen, nitrogen oxides, and sulfur dioxide.

6. The method of claim 1, wherein said at least one gas source is selected from the group consisting of a microvolume tube, an adjustable gas bellows system, a syringe and a gas bottle.

7. The method of claim 6, wherein the microvolume tube is a microvolume CaCO3 decomposition tube.

8. The method of claim 1, wherein crimping the first capillary includes crimping at a section where an inner diameter of the first capillary is in a range from about 100 to about 800 micrometres, in a range from about 200 to about 600 micrometres, in a range from about 200 to about 500 micrometres, or in a range from about 200 to about 400 micrometres.

9. The method of claim 8, wherein the section of the first capillary is a narrower section, the first capillary having the narrower section and a wider section with a second, larger diameter than the first diameter, the narrower section including the coating.

10. The method of claim 9, wherein the second, larger diameter of the wider section is in a range from about 300 micrometres to about 2 millimetres, in a range from about 500 micrometres to about 2 millimetres, in a range from about 300 micrometres to about 1.5 millimetres, in a range from about 500 micrometres to about 1.5 millimetres, in a range from about 300 micrometres to about 1 millimetre, or in a range from about 500 micrometres to about 1 millimetre.

* * * * *